United States Patent
Chen et al.

(12)

(10) Patent No.: US 12,024,884 B2
(45) Date of Patent: Jul. 2, 2024

(54) CONTINUOUS FRP COMPOSITE FIBER TRUSS SHEAR CONNECTOR

(71) Applicants: SFTec Inc., Montreal (CA); Shandong Safety Industries Co., Ltd., Tai'an (CN)

(72) Inventors: Wenxue Chen, Tai'an (CN); Yuzhao Jiao, Tai'an (CN)

( * ) Notice: Subject to any disclaimer, the term of this patent is extended or adjusted under 35 U.S.C. 154(b) by 318 days.

(21) Appl. No.: 17/473,907

(22) Filed: Sep. 13, 2021

(65) Prior Publication Data

US 2022/0213686 A1    Jul. 7, 2022

(51) Int. Cl.
*E04C 2/32* (2006.01)
*B32B 5/02* (2006.01)
*B32B 13/14* (2006.01)
*E04C 2/288* (2006.01)

(52) U.S. Cl.
CPC ............... *E04C 2/288* (2013.01); *B32B 5/02* (2013.01); *B32B 13/14* (2013.01); *B32B 2260/021* (2013.01); *B32B 2260/046* (2013.01); *B32B 2262/101* (2013.01); *B32B 2262/106* (2013.01); *B32B 2262/108* (2013.01); *B32B 2307/304* (2013.01); *B32B 2419/00* (2013.01)

(58) Field of Classification Search
CPC ............... B32B 13/14; B32B 2419/00; B32B 2260/021; B32B 5/02; E04C 2/288
See application file for complete search history.

(56) References Cited

U.S. PATENT DOCUMENTS

| 2,616,283 | A | * | 11/1952 | Branstrator | E04C 2/28 52/550 |
| 2,839,812 | A | * | 6/1958 | Berliner | B28B 23/02 264/254 |
| 2,934,934 | A | * | 5/1960 | Berliner | E04C 2/06 52/432 |
| 3,604,164 | A | * | 9/1971 | Mason | E04C 2/54 D25/164 |
| 3,969,563 | A | * | 7/1976 | Hollis, Sr. | F41H 5/0464 428/920 |
| 4,346,541 | A | * | 8/1982 | Schmitt | B32B 29/08 52/783.17 |
| 4,593,449 | A | * | 6/1986 | Meray-Hovarth | E04C 2/3405 428/117 |
| 5,165,213 | A | * | 11/1992 | Finch | E04B 2/721 52/578 |
| 6,148,586 | A | * | 11/2000 | Jandl | E04C 2/292 52/783.17 |
| 6,205,728 | B1 | * | 3/2001 | Sutelan | E04C 2/365 52/783.17 |

(Continued)

*Primary Examiner* — Basil S Katcheves

(57) ABSTRACT

A continuous FRP composite fiber truss shear connector is provided. The connector includes two folding line segments I and multiple folding line segments II. Multiple folding line segments II are connected in sequence end to end, and the two folding line segments I are respectively connected to the head end of the first folding line segment II and the tail end of the last folding line segment II; and the included angle between the adjacent folding line segments II is 20°-140°. The present disclosure achieves the rigid connection strength of walls, and can cut off thermal bridge connection so as to greatly improve the thermal insulation efficiency of precast concrete sandwich panels.

4 Claims, 1 Drawing Sheet

(56) References Cited

U.S. PATENT DOCUMENTS

| | | | | |
|---|---|---|---|---|
| 6,260,323 | B1* | 7/2001 | Hockey | E04B 2/74 |
| | | | | 52/537 |
| 6,773,791 | B1* | 8/2004 | Ruggie | E04C 3/16 |
| | | | | 428/156 |
| 7,406,806 | B2* | 8/2008 | Hallissy | E04B 1/98 |
| | | | | 52/309.7 |
| 7,416,775 | B2* | 8/2008 | Snel | B32B 29/08 |
| | | | | 428/184 |
| 9,103,115 | B2* | 8/2015 | Wolf | E04B 1/8409 |
| 9,212,485 | B2* | 12/2015 | Wolynski | C04B 28/04 |
| 9,702,152 | B2* | 7/2017 | Sievers | E04F 13/0869 |
| 9,740,799 | B2* | 8/2017 | Herdt | B29C 53/063 |
| 10,633,859 | B2* | 4/2020 | Grimsson | E04C 2/296 |
| 10,934,716 | B2* | 3/2021 | Billings | B29C 44/321 |
| 2004/0074206 | A1* | 4/2004 | Tanase | E04B 1/86 |
| | | | | 52/783.17 |
| 2008/0090477 | A1* | 4/2008 | Balthes | D04H 1/425 |
| | | | | 427/299 |
| 2009/0255205 | A1* | 10/2009 | Noble | B27N 5/00 |
| | | | | 52/630 |
| 2010/0323181 | A1* | 12/2010 | Nutt | B29D 99/0021 |
| | | | | 428/221 |
| 2011/0072746 | A1* | 3/2011 | Dagher | E04B 7/20 |
| | | | | 52/302.1 |
| 2012/0085062 | A1* | 4/2012 | Neumayr | E04C 2/3405 |
| | | | | 52/578 |
| 2012/0225237 | A1* | 9/2012 | Brockwell | E04C 3/29 |
| | | | | 428/68 |
| 2015/0089891 | A1* | 4/2015 | Schiffmann | E04C 2/46 |
| | | | | 52/309.1 |
| 2018/0274236 | A1* | 9/2018 | Singleton | E01D 6/00 |
| 2019/0265015 | A1* | 8/2019 | Michiwaki | G01B 7/16 |
| 2019/0276994 | A1* | 9/2019 | Dagher | E04C 3/28 |
| 2020/0080297 | A1* | 3/2020 | Wright | E04C 3/16 |

* cited by examiner

CONTINUOUS FRP COMPOSITE FIBER TRUSS SHEAR CONNECTOR

TECHNICAL FIELD

The present invention belongs to the technical field of shear connectors, and more particularly relates to a continuous FRP composite fiber truss shear connector.

BACKGROUND

Precast concrete sandwich panels refer to thermal insulation sandwich panels, which are usually used as external walls or load bearing members in institution, commercial and light industry buildings. Such wall is composed of a structural external wall, a thermal insulation material and shear connectors. The shear connector is used for transferring horizontal shear force between concrete and concrete to increase the wall rigidity. A traditional shear connector comprises a steel mesh and a steel connector, and the low thermal resistance of steel and concrete connectors results in low thermal insulation efficiency of precast concrete sandwich panels.

Therefore, the problem to be urgently solved by those skilled in the art is how to provide a continuous FRP composite fiber truss shear connector.

SUMMARY

In view of this, the present invention provides a continuous FRP composite fiber truss shear connector, which meets the rigidity requirement of walls and can cut off thermal bridge connection so as to greatly improve the thermal insulation efficiency of precast concrete sandwich panels.

To achieve the above purpose, the present invention adopts the following technical solution:

A continuous FRP composite fiber truss shear connector, comprises two folding line segments I and a plurality of folding line segments II, wherein the plurality of folding line segments II are connected in sequence end to end, and the two folding line segments I are respectively connected to the head end of the first folding line segment II and the tail end of the last folding line segment II; and the included angle between the adjacent folding line segments II is 20°-140°.

Preferably, the included angle between the folding line segment I and the connected folding line segment II is 20°-140°.

Preferably, the length of the folding line segment I is ¼ of that of the folding line segment II.

Preferably, R>1.5 d, wherein R represents the bending radius at the joint of two folding line segments II, and d represents the length of the folding line segment II.

Preferably, the two folding line segments I and the plurality of folding line segments II are integrated in one piece.

Preferably, the two folding line segments I and the plurality of folding line segments II are made of a composite fiber material.

Preferably, the composite fiber material is one of glass fiber, carbon fiber and basalt fiber.

Preferably, the surfaces of the two folding line segments I and the plurality of folding line segments II are treated by abrasive blasting, threading or compression moulding.

Preferably, a thermal insulation material is arranged in an external wall, the plurality of folding line segments II are penetrated through the thermal insulation material, and the joints of the folding line segments II and the joints of the folding line segments II and the folding line segments I are located in the external wall; and both end points of the folding line segments I are penetrated into the thermal insulation material.

The present invention has the following beneficial effects:

The present invention can cut off thermal bridge connection so as to greatly improve the thermal insulation efficiency of precast concrete sandwich panels, and helps to enhance the shear strength of precast concrete sandwich panels so as to improve the structural performance of precast concrete sandwich panels; and the present invention has low density and can reduce the overall weight of precast concrete sandwich panels.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

IN THE FIGURES

1—folding line segment I; 2—folding line segment II; 3—external wall; and 4—thermal insulation material.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
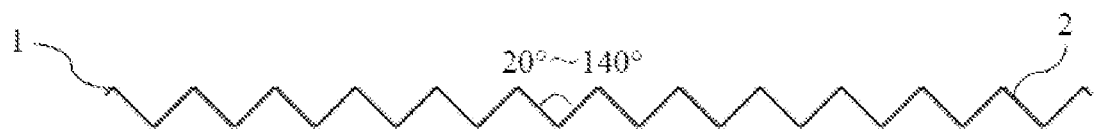
FIG. 1 is a structural schematic diagram of the present invention.

Referring to FIG. 1, the present invention provides a continuous FRP composite fiber truss shear connector, comprising two folding line segments I 1 and a plurality of folding line segments II 2, wherein the plurality of folding line segments II 2 are connected in sequence end to end, and the two folding line segments I 1 are respectively connected to the head end of the first folding line segment II 2 and the tail end of the last folding line segment II; and the included angle between the adjacent folding line segments II 2 is 20°-140°, preferably 90°. The smaller the included angle is, the higher the rigidity provided for the external wall 3 is. The included angle of 90° is the balance point between rigidity and material saving.

In the embodiment, the included angle between the folding line segment I 1 and the connected folding line segment II 2 is 20°-140°, preferably 90°.

In the embodiment, the length of the folding line segment I 1 is ¼ of that of the folding line segment II 2, and length selection ensures that the folding line segments I can be embedded in the external wall 3 and the thermal insulation material 4.

In the embodiment, R>1.5 d, wherein R represents the bending radius at the joint of two folding line segments II, and d represents the length of the folding line segment II.

In the embodiment, the two folding line segments I 1 and the plurality of folding line segments II 2 are integrated in one piece.

In the embodiment, the two folding line segments I 1 and the plurality of folding line segments II 2 are made of a composite fiber material.

In the embodiment, the composite fiber material is one of glass fiber, carbon fiber and basalt fiber, or another material, which is cheaper than steel connectors and thus can reduce production cost.

In the embodiment, the surfaces of the two folding line segments I 1 and the plurality of folding line segments II 2 are treated by abrasive blasting, threading, compression moulding, or other means, with the purpose of increasing the friction between the continuous FRP composite fiber truss shear connector and the thermal insulation material 4 and the external wall 3 so as to enhance the firmness of connection.

Figure 2:
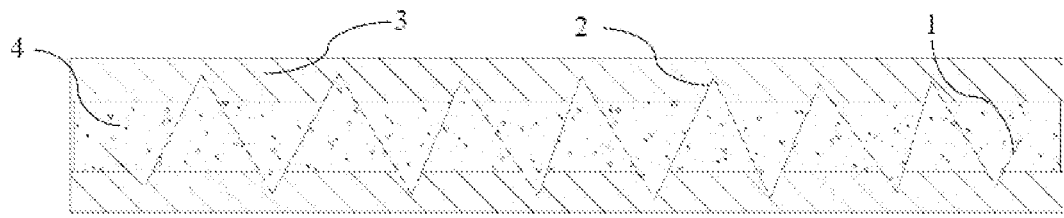
FIG. 2 is a structural schematic diagram of a precast concrete sandwich panel with a continuous FRP composite fiber truss shear connector.

Referring to FIG. 2, the thermal insulation material 4 is arranged in the external wall 3, the plurality of folding line segments II 2 are penetrated through the thermal insulation material 4, and the joints of the folding line segments II 2 and the joints of the folding line segments II 2 and the folding line segments I 1 are located in the external wall 3; and both end points of the folding line segments I 1 are penetrated into the thermal insulation material 4 so as to greatly improve the installation firmness of the continuous FRP composite fiber truss shear connector.

The present invention has low heat transfer performance, can cut off thermal bridge connection so as to greatly improve the thermal insulation efficiency of precast concrete sandwich panels, and helps to enhance the shear strength of precast concrete sandwich panels so as to improve the structural performance of precast concrete sandwich panels; and the present invention has low density and can reduce the overall weight of precast concrete sandwich panels. In addition, the material of the present invention is cheap and thus can greatly save production cost.

Each embodiment in the description is described in a progressive way. The difference of each embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A continuous fiber reinforced polymer (FRP) composite fiber truss shear connector, comprising two first folding line segments and a plurality of second folding line segments with sharp crests; wherein the plurality of second folding line segments are connected in sequence end to end, and one of the first folding line segment is connected to a head end of the plurality of second folding line segments and another one of the first folding line segment is connected to a tail end of the plurality of second folding line segments and an included angle between two adjacent second folding line segments is 20°-140°; and wherein the two first folding line segments and the plurality of second folding line segments are manufactured simultaneously; the two first folding line segments and the plurality of second folding line segments are made of a composite fiber material; the composite fiber material is one of glass fiber, carbon fiber and basalt fiber; surfaces of the two first folding line segments and the plurality of second folding line segments are treated by abrasive blasting, threading or compression molding, a thermal insulation material is arranged in external walls, the plurality of second folding line segments are penetrated through the thermal insulation material, and joints of the second folding line segments and joints of the first folding line segments are disposed in the external walls; and both end points of the first folding line segments are penetrated into the thermal insulation material.

2. The continuous FRP composite fiber truss shear connector of claim 1, wherein the included angle between the first folding line segments and the second folding line segments is 20°-140°.

3. The continuous FRP composite fiber truss shear connector of claim 2, wherein a length of each of the first folding line segments is ¼ of that of each of the second folding line segments.

4. The continuous FRP composite fiber truss shear connector of claim 1, wherein R>1.5 d, the R donates bending radius at joint of the two adjacent second folding line segments, and d donates a length of each of the second folding line segments.

* * * * *